(12) United States Patent
Narita

(10) Patent No.: US 9,487,594 B2
(45) Date of Patent: Nov. 8, 2016

(54) METHOD FOR PRODUCING WATER-SOLUBLE NONIONIC CELLULOSE ETHER EXCELLENT IN STORAGE STABILITY

(71) Applicant: Shin-Etsu Chemical Co., Ltd., Tokyo (JP)

(72) Inventor: Mitsuo Narita, Niigata-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 14/305,174

(22) Filed: Jun. 16, 2014

(65) Prior Publication Data

US 2015/0005486 A1    Jan. 1, 2015

(30) Foreign Application Priority Data

Jun. 26, 2013 (JP) .................................. 2013-133704

(51) Int. Cl.
    *C08B 11/08*     (2006.01)
    *C08B 11/00*     (2006.01)
    *C08B 11/20*     (2006.01)
    *C08B 11/193*    (2006.01)

(52) U.S. Cl.
    CPC ............... *C08B 11/20* (2013.01); *C08B 11/00* (2013.01); *C08B 11/08* (2013.01); *C08B 11/193* (2013.01)

(58) Field of Classification Search
    CPC .............................. C08B 11/08; C08B 11/00
    USPC .................................................... 536/91, 95
    See application file for complete search history.

(56) References Cited

U.S. PATENT DOCUMENTS

| 3,489,719 A * | 1/1970 | Savage ................. C02F 1/5227 525/385 |
| 3,709,876 A * | 1/1973 | Glomski et al. ...... C08B 11/193 106/172.1 |
| 4,076,935 A | 2/1978 | Eichenseer et al. |
| 4,096,325 A | 6/1978 | Teng et al. |
| 4,096,326 A | 6/1978 | Reid |
| 2006/0122384 A1 | 6/2006 | Hayakawa et al. |

FOREIGN PATENT DOCUMENTS

| EP | 2 567 984 A1 | 3/2013 |
| JP | S51-83655 A | 7/1976 |
| JP | H10-158302 A | 6/1998 |
| JP | 2006-152276 A | 6/2006 |

OTHER PUBLICATIONS

Extended European Search Report from European Patent Application No. 14173796.5 dated Jan. 7, 2015.
Official Monographs/Hydroxpropylcellulose, JP XVI, Japanese Pharmacopoeia 16$^{th}$ Edition (undated),, General Notices p. 1, also pp. 935-936, 940-942, and 1096-1098.

* cited by examiner

*Primary Examiner* — Sudhakar Katakam
*Assistant Examiner* — Everett White
(74) *Attorney, Agent, or Firm* — Alston & Bird LLP

(57) ABSTRACT

Provided is a water-soluble nonionic cellulose ether excellent in storage stability. More specifically, provided is a method for producing a water-soluble nonionic cellulose ether including an etherification step of reacting an alkali cellulose with an etherifying agent to obtain a crude cellulose ether, a washing step of washing the crude cellulose ether to obtain a washed cellulose ether, a drying step of drying the washed cellulose ether, and a grinding step of grinding the cellulose ether during or after the drying, wherein during the washing step or in any of the steps after the washing step, a pH regulator is mixed so as to allow an aqueous 2% by weight solution of the cellulose ether as an end product to have a pH value of from 7.0 to 10.5.

13 Claims, No Drawings

METHOD FOR PRODUCING WATER-SOLUBLE NONIONIC CELLULOSE ETHER EXCELLENT IN STORAGE STABILITY

FIELD

The present invention relates to a method for producing a water-soluble nonionic cellulose ether to be used in a chemical field, a building material field, and the like.

BACKGROUND

A water-soluble nonionic cellulose ether has a thickening effect so that it has conventionally been used as a thickener for chemicals, a thickener for building materials, a water retention agent, a binder to be used in extrusion, a pharmaceutical additive, and the like.

As a typical method for producing a water-soluble nonionic cellulose ether, there is, for example, a method comprising the steps of adding a solution of an alkali metal hydroxide such as sodium hydroxide to pulp, adding an etherifying agent such as methyl chloride, ethylene oxide or propylene oxide for the reaction, purifying the reaction mixture, and drying the wet water-soluble nonionic cellulose ether obtained by purification, followed by grinding, or subjecting it to simultaneous drying and grinding (JP 10-158302A, JP 2006-152276A and JP 51-83655A).

In the above-mentioned method, each of hypromellose, methyl cellulose and hydroxypropyl cellulose, which is a water-soluble nonionic cellulose ether, allows an aqueous 2% by weight solution thereof to have a pH value of from 5.0 to 8.0 (the Japanese Pharmacopoeia 16th Edition).

SUMMARY

However, due to a decrease in the degree of polymerization during the storage period of water-soluble nonionic cellulose ethers from production to actual use, they have sometimes already lost their expected thickening property at the time of use. Particularly when grinding is conducted with a rod mill or a ball mill, such a loss is marked. In view of such circumstances, the invention has been made. An object of the invention is to provide a water-soluble nonionic cellulose ether excellent in storage stability.

With a view to achieving the above-mentioned object, the present inventors carried out an investigation so as to find a factor causing a difference in the degree of viscosity reduction of a water-soluble nonionic cellulose ether during a storage period. As a result, they have found a relationship between a pH value during the storage period and a reduction in viscosity and have completed a method for producing a water-soluble nonionic cellulose ether that does not easily undergo a reduction in the degree of polymerization and is excellent in storage stability.

In the invention, there is provided a method for producing a water-soluble nonionic cellulose ether comprising an etherification step of reacting an alkali cellulose with an etherifying agent to obtain a crude cellulose ether, a washing step of washing the crude cellulose ether with water to obtain a washed cellulose ether, a drying step of drying the washed cellulose ether, and a grinding step of grinding the cellulose ether during or after the drying, wherein in the washing step or in any of the steps after the washing step, a pH regulator is mixed so as to allow an aqueous 2% by weight solution of the water-soluble nonionic cellulose ether as an end product to have a pH value of from 7.0 to 10.5.

According to the invention, a water-soluble nonionic cellulose ether having resistance to undergo a reduction in the degree of polymerization and being excellent in storage stability can be provided.

DETAILED DESCRIPTION

Examples of the water-soluble nonionic cellulose ether may include alkyl celluloses, hydroxyalkyl celluloses and hydroxyalkyl alkyl celluloses.

Examples of the alkyl celluloses include methyl cellulose having a degree of substitution (DS) of from 1.0 to 2.2 and ethyl cellulose having a degree of substitution (DS) of from 2.0 to 2.6. Examples of the hydroxyalkyl celluloses include hydroxyethyl cellulose having a molar substitution (MS) of from 0.05 to 3.0 and hydroxypropyl cellulose having a molar substitution (MS) of from 0.05 to 3.3. Examples of the hydroxyalkyl alkyl celluloses include hydroxyethyl methyl cellulose having a degree of substitution (DS) of from 1.0 to 2.2 and a molar substitution (MS) of from 0.1 to 0.6, hydroxypropyl methyl cellulose (hypromellose) having a degree substitution (DS) of from 1.0 to 2.2 and a molar substitution (MS) of from 0.1 to 0.6, and hydroxyethyl ethyl cellulose having a degree of substitution (DS) of from 1.0 to 2.2 and a molar substitution (MS) of from 0.1 to 0.6. Usually, alkyl substitution is described by DS and hydroxyalkyl substitution is described by MS. The DS means an average number per glucose ring unit of hydroxyl groups substituted by alkyl groups, while the MS means an average number of moles of hydroxyalkyl groups bonded to a glucose unit. They can be calculated from the measurement results obtained according to the method of the Japanese Pharmacopoeia.

The water-soluble nonionic cellulose ether can be produced, for example, by the following method.

First, in the etherification step of reacting an alkali cellulose with an etherifying agent, a crude cellulose ether can be obtained. The alkali cellulose can be obtained by bringing a solution of alkali metal hydroxide such as sodium hydroxide into contact with pulp. The etherification may be conducted by simultaneous formation of an alkali cellulose and reaction of the alkali cellulose with the etherifying agent in coexistence of the alkali metal hydroxide solution and the etherifying agent, or by formation of an alkali cellulose and subsequent reaction of the alkali cellulose with the etherifying agent.

Examples of the etherifying agent include alkyl halides such as methyl chloride, ethylene oxide, and propylene oxide.

A molar ratio of an etherifying agent to an alkali metal hydroxide for the formation of an alkali cellulose is preferably from 0.8 to 1.3, more preferably from 0.9 to 1.1, still more preferably from 0.95 to 1.0.

The crude cellulose ether becomes a water-soluble nonionic cellulose ether as an end product, through steps comprising a washing step, a drying step and a grinding step. A water-soluble nonionic cellulose ether which does not easily undergo a reduction in the degree of polymerization and is excellent in storage stability during a storage period can be obtained by incorporation of a pH regulator in the washing step or in any of the steps after the washing step in such a manner that an aqueous 2% by weight solution of water-soluble nonionic cellulose ether as an end product has a pH value of from 7.0 to 10.5. The pH is determined according to the pH determination method specified in the Japanese Pharmacopoeia.

The pH regulator is not particularly limited insofar as it can adjust an pH value of an aqueous 2% by weight solution of water-soluble nonionic cellulose ether as an end product, to from 7.0 to 10.5, preferably greater than 8.0 but not greater than 10.5, more preferably from 8.2 to 10.5, still more preferably from 8.5 to 10.5. The pH regulator is preferably at least one selected from the group consisting of alkali metal hydroxides such as sodium hydroxide and potassium hydroxide and salts such as sodium carbonate and sodium bicarbonate.

The amount of the pH regulator differs depending on an addition time or a type of the pH regulator. The amount of the pH regulator can be selected to become such an amount that an aqueous 2% by weight solution of water-soluble nonionic cellulose ether as an end product falls within a range of from 7.0 to 10.5, preferably within a range of greater than 8.0 but not greater than 10.5. For example, the relation between an added amount of the pH regulator at a certain stage and a pH value of the aqueous 2% by weight solution of water-soluble non-ionic cellulose ether as an end product may be measured in advance, an amount of the pH regulator which allows a pH value to fall within the range of from 7.0 to 10.5 may be calculated, and then the pH regulator may be added in the amount thus calculated. Alternatively, when the pH regulator is added to the cellulose ether in a stage just before it becomes an end product, a pH value of an aqueous 2% by weight solution of the cellulose ether is measured, an amount of the pH regulator which allows a pH value to fall within the range of from 7.0 to 10.5 is calculated, and then the pH regulator is added in the amount thus calculated.

The pH regulator may be added once or two or more times. The addition frequency of the pH regulator may be selected in such a manner that a pH value of an aqueous 2% by weight solution of water-soluble non-ionic cellulose ether as an end product falls within a range of from 7.0 to 10.5.

The pH regulator may be added as it is. Alternatively, the pH regulator is preferably added as a pH regulator solution obtained by dissolving it in a solvent from the standpoint of uniform distribution. The pH regulator is more preferably added as an aqueous pH regulator solution.

The washing step may preferably comprise a dispersing stage of dispersing the crude cellulose ether in water, preferably hot water of from 70 to 100° C. to obtain a dispersion and a filtering stage of filtering the dispersion thus obtained. In the filtering stage, a reaction byproduct or a raw material remaining unreacted may be removed by optionally adding a rinsing liquid (preferably water, more preferably hot water of from 70 to 100° C.) during or after filtration. Alternatively, the reaction byproduct or raw material remaining unreacted may be removed by optionally dispersing a solid matter (residue) after filtration in water (preferably hot water of from 70 to 100° C.) again.

As a filtration apparatus, a known apparatus such as a vacuum filter, a pressure filter, a centrifugal dehydrator and a mechanical press can be used.

When the pH regulator is added in the washing step, the pH regulator is preferably incorporated into the cellulose ether dispersion in the dispersing stage. In other words, this step may comprise a dispersing stage in which the crude cellulose ether, pH regulator and water are mixed to obtain a cellulose ether dispersion, and a filtering stage in which the cellulose ether dispersion containing the pH regulator is filtered. Alternatively, in a filtering stage, a residue is rinsed with a rinsing liquid containing a pH regulator (preferably an aqueous solution of a pH regulator).

The cellulose ether dispersion containing the pH regulator has a pH value of preferably from 7.0 to 14.0, more preferably from 7.0 to 13.5. The aqueous rinsing solution of the pH regulator has a pH value of preferably from 7.0 to 14.0, more preferably from 7.0 to 13.5.

With regard to the pH regulator in the washing step, when the residual wet cake has water content of preferably from 30 to 85% by weight, more preferably from 40 to 70% by weight, the pH of the dispersion prior to the filtration almost coincides with the pH value of the aqueous 2% by weight solution pH of solid water-soluble nonionic cellulose ether as an end product.

After the washing step but before the drying step, the washed cellulose ether can be subjected to a step of adding water for adjusting water content and/or cooling the cellulose ether, that is, an optional gelation step in order to adjust an apparent density of the water-soluble nonionic cellulose ether as an end product.

When the pH regulator is added in the gelation step, any of the following methods can be employed: a method of dissolving the pH regulator in the water to be added; a method of adding a small amount of aqueous pH regulator solution, separately from the water to be added; and a method of adding the pH regulator in a solid form.

In a drying step, the wet cellulose ether after washing or after the optional gelation step is dried. As the drier, a known drier such as a paddle drier, a fluidized drier, or a belt drier can be used.

When the pH regulator is added in the drying step, the pH regulator may be added before, during or after drying. For example, a method of adding the pH regulator as a small amount of aqueous pH regulator solution into a drier, or a method of adding the pH regulator in a solid form such as a granular form into a drier may be preferably employed.

In a grinding step, the dried cellulose ether is ground. As the grinder, a known grinder such as an impact grinder, a rod mill, a ball mill, a roller mill and a turbo mill can be used. Of these grinders, a rod mill or a ball mill is particularly preferred. Grinding with a rod mill or a ball mill may decrease the pH value of the aqueous solution of the water-soluble nonionic cellulose ether thus obtained. It is presumably because an acid group such as carboxylic acid is likely to be formed due to a mechanochemical reaction during grinding.

When the pH regulator is added in the grinding step, for example, a method of adding a small amount of aqueous pH regulator solution in a grinder, or a method of adding the pH regulator in a solid form in a grinder may be employed.

The wet cellulose ether after the washing step or the optional gelation step may be subjected to simultaneous drying and grinding steps. This means that the grinding step comprises grinding of the cellulose ether during drying. When the pH regulator is added in the grinding step, for example, the grinding step comprises grinding the cellulose ether which is being dried while adding the pH regulator thereto.

As a drying grinder, a known grinder such as an impact grinder can be used.

The grinding step preferably comprises an optional mixing stage of mixing the water-soluble nonionic cellulose ether after a grinding stage in order to obtain a uniform particle size distribution, uniform viscosity, uniform degree of substitution, or the like. When the pH regulator is added in the grinding step, it may be added in the mixing stage.

As a mixer, a known mixer such as a mixer of cone type, ribbon type, screw type, or airborne type can be used.

According to the invention, the pH regulator is not added when a cellulose ether is mixed after depolymerization with an acid or the like. It is because a cellulose ether having a high degree of polymerization cannot be obtained when the depolymerization is conducted.

The resulting water-soluble nonionic cellulose ether as an end product allows an aqueous 2% by weight solution thereof to have a pH value of from 7.0 to 10.5. During the storage period, it does not easily undergo a reduction in the degree of polymerization and is excellent in storage stability.

The ignition residue of the water-soluble nonionic cellulose ether as an end product is preferably from 0.01 to 4.0% by weight, more preferably from 0.02 to 2.0% by weight. When the ignition residue is less than 0.01% by weight, a pH value of the aqueous 2% by weight solution of the water-soluble nonionic cellulose ether as an end product may be less than 7.0. When the ignition residue is more than 4.0% by weight, the pH value may be more than 10.5. The ignition residue occurs owing to metals and can be determined by the assay of the ignition residue of hypromellose specified in the Japanese Pharmacopoeia.

The viscosity at 20° C. of aqueous 2% by weight solution of water-soluble nonionic cellulose ether as an end product is preferably from 100 to 600000 mPa·s, more preferably from 4000 to 300000 mPa·s, still more preferably from 30000 to 200000 mPa·s. The viscosity can be determined by the viscosity measurement method of hypromellose specified in the Japanese Pharmacopoeia.

EXAMPLES

The invention will hereinafter be described specifically by Examples. It should not be construed that the invention is limited to or by the Examples. It should be noted that "HM-30R", which is a product of DKK-TOA CORPORATION, was used as a pH meter.

Example 1

Incorporation of a pH Regulator Into a Cellulose Ether Dispersion in a Washing Step To 1.00 part by weight of linter pulp were added 1.41 parts by weight of aqueous 49% by weight sodium hydroxide solution, 0.96 part by weight of methyl chloride for methoxy substitution, and 0.28 part by weight of propylene oxide for hydroxypropoxy substitution, and the resulting mixture was reacted. A weight ratio of unreacted sodium hydroxide in the crude hydroxypropyl methyl cellulose to the crude hydroxypropyl methyl cellulose was 0.01.

The 1.00 part by weight of crude hydroxypropyl methyl cellulose was added to and dispersed in 100 parts by weight of hot water of 95° C. To the resulting dispersion was added 0.0019 parts by weight of aqueous 49% by weight sodium hydroxide solution to adjust the pH of the dispersion to 10.4. The resulting dispersion was filtered to obtain a cake having water content of 40% by weight. The cake was subjected to drying and subsequent grinding with a ball mill to obtain hydroxypropyl methyl cellulose powder. The hydroxypropyl methyl cellulose powder had a degree of substitution (DS) of 1.50 and a molar substitution (MS) of 0.25, the viscosity at 20° C. of aqueous 2% by weight solution thereof of 100000 mPa·s, a pH value of 10.3, and an ignition residue of 0.2% by weight.

The hydroxypropyl methyl cellulose powder was hermetically sealed and stored in a constant temperature room of 80° C. The viscosities at 20° C. of aqueous 2% by weight solutions of the hydroxypropyl methyl cellulose powders stored for one month and for two months are shown in Table 1.

Example 2

Incorporation of a pH Regulator Into a Rinsing Liquid in a Washing Step

Crude hydroxypropyl methyl cellulose was obtained in the same manner as in Example 1.

The 1.00 parts by weight of crude hydroxypropylmethy cellulose was added to and dispersed in 20 parts by weight of hot water of 95° C., followed by filtration to obtain a cake. The cake was filtered again while adding thereto rinsing hot water of 95° C. adjusted to a pH 7.9 by using an aqueous 49% by weight sodium hydroxide solution. The amount of the rinsing hot water was 5 parts by weight on basis of 1.00 part by weight of hydroxypropyl methyl cellulose. After the filtration, a cake having water content of 40% by weight was obtained. Then, the cake having water content of 40% by weight was dried and then ground with a rod mill to obtain hydroxypropyl methyl cellulose powder. The hydroxypropyl methyl cellulose powder had a DS of 1.50 and an MS of 0.25, the viscosity at 20° C. of aqueous 2% by weight solution thereof of 100000 mPa·s, and a pH value of 8.0.

The hydroxypropyl methyl cellulose powder was hermetically sealed and stored in a constant temperature room of 80° C. The viscosities at 20° C. of aqueous 2% by weight solutions of the hydroxypropyl methyl cellulose powders stored for one month and for two months are shown in Table 1.

Example 3

Addition of a pH Regulator in a Grinding Step

Crude hydroxypropyl methyl cellulose was obtained in the same manner as in Example 1 except that wood pulp was used instead of linter pulp.

The crude hydroxypropyl methyl cellulose was washed with hot water of 95° C., dried at 100° C., and ground with a ball mill. In the grinding step, 0.0002 parts by weight of sodium bicarbonate powder was added as a pH regulator to the 1.00 part by weight of the hydroxypropyl methyl cellulose, and mixed to obtain hydroxypropyl methyl cellulose powder. The hydroxypropyl methyl cellulose powder had a DS of 1.50 and an MS of 0.25, the viscosity at 20° C. of aqueous 2% by weight solution thereof of 100000 mPa·s, and a pH value of 7.1.

The hydroxypropyl methyl cellulose powder was hermetically sealed and stored in a constant temperature room of 80° C. The viscosities at 20° C. of aqueous 2% by weight solutions of the hydroxypropyl methyl cellulose powders stored for one month and for two months are shown in Table 1.

Example 4

Addition of a pH Regulator in a Mixing Stage After Grinding

Crude hydroxypropyl methyl cellulose was obtained in the same manner as in Example 1.

The crude hydroxypropyl methyl cellulose was washed with hot water of 95° C., dried at 100° C., and ground with a ball mill to obtain hydroxypropyl methyl cellulose powder.

The hydroxypropyl methyl cellulose powder had a DS of 1.50 and an MS of 0.25, the viscosity at 20° C. of aqueous 2% by weight solution thereof of 100000 mPa·s, and a pH value of 6.8.

The 1.00 part by weight of hydroxypropyl methyl cellulose powder was subjected to addition of 0.0001 part by weight of sodium bicarbonate powder, and to mixing to obtain a uniform mixture. The pH value of aqueous 2% by weight solution thereof of the hydroxypropyl methyl cellulose powder after pH adjustment in the mixing step was 7.2.

The hydroxypropyl methyl cellulose powder after pH adjustment was hermetically sealed and stored in a constant temperature room of 80° C. The viscosities at 20° C. of aqueous 2% by weight solutions of the hydroxypropyl methyl cellulose powders stored for one month and for two months are shown in Table 1.

Example 5

Addition of a pH Regulator in a Mixing Stage After Grinding

The hydroxypropyl methyl cellulose powder after pH adjustment in the mixing step was obtained in the same manner as in Example 4 except that 0.00025 parts by weight of sodium carbonate powder was added to 1.00 part by weight of the hydroxypropyl methyl cellulose powder. The pH value of aqueous 2% by weight solution of the hydroxypropyl methyl cellulose powder after pH adjustment in the mixing step was 9.0.

The hydroxypropyl methyl cellulose powder after pH adjustment was hermetically sealed and stored in a constant temperature room of 80° C. The viscosities at 20° C. of aqueous 2% by weight solutions of the hydroxypropyl methyl cellulose powders stored for one month and for two months are shown in Table 1.

Example 6

Addition of a pH Regulator in a Mixing Step After Grinding

The hydroxypropyl methyl cellulose powder after pH adjustment in the mixing step was obtained in the same manner as in Example 4 except that 0.0025 parts by weight of sodium carbonate powder was added to 1.00 part by weight of the hydroxypropyl methyl cellulose powder. A pH value of aqueous 2% by weight solution of the hydroxypropyl methyl cellulose powder after pH adjustment in the mixing step was 10.0.

The hydroxypropyl methyl cellulose powder after pH adjustment was hermetically sealed and stored in a constant temperature room of 80° C. The viscosities at 20° C. of aqueous 2% by weight solutions of the hydroxypropyl methyl cellulose powders stored for one month and for two months are shown in Table 1.

Example 7

Addition of a pH Regulator in a Gelation Step

Crude hydroxypropyl methyl cellulose was obtained in the same manner in Example 1.

The crude hydroxypropyl methyl cellulose was washed with hot water of 95° C. Then the resulting washed cake was subjected to a gelation step by cooling to a temperature of 15° C. while adding thereto water in an amount which allows the cake to have wet-based water content of 65% by weight. The wet-based water content can be calculated by the equation: {(weight of water in the cake)/(weight of cake)}×100, which is distinguishable from a dry-based water content calculated by the equation: {(weight of water in the cake)/(weight of solid component in the cake)}×100. In the gelation step, at the same time, 0.0002 parts by weight of sodium bicarbonate powder was added to 1.00 part by weight of the hydroxypropyl methyl cellulose. After drying, the mixture was ground and mixed with a rod mill to obtain hydroxypropyl methyl cellulose powder. The hydroxypropyl methyl cellulose powder had a DS of 1.50 and an MS of 0.25, the viscosity at 20° C. of aqueous 2% by weight solution thereof of 100000 mPa·s, and a pH value of 7.1.

The hydroxypropyl methyl cellulose powder was hermetically sealed and stored in a constant temperature room of 80° C. The viscosities at 20° C. of aqueous 2% by weight solutions of the hydroxypropyl methyl cellulose powders stored for one month and for two months are shown in Table 1.

Comparative Example 1

Without Addition of pH Regulator

To 1.00 part by weight of linter pulp were added 1.41 parts by weight of aqueous 49% by weight sodium hydroxide solution, 0.96 part by weight of methyl chloride, and 0.28 part by weight of propylene oxide, and the resulting mixture was reacted.

The crude hydroxypropyl methyl cellulose thus obtained was washed until the ignition reside of the washed hydroxypropyl methyl cellulose became 0.2% by weight. After drying, it was ground with a ball mill to obtain hydroxypropyl methyl cellulose powder. The hydroxypropyl methyl cellulose powder had a DS of 1.50 and an MS of 0.25, the viscosity at 20° C. of aqueous 2% by weight solution thereof of 100000 mPa·s, and a pH value of 6.8.

The hydroxypropyl methyl cellulose powder was hermetically sealed and stored in a constant temperature room of 80° C. The viscosities at 20° C. of aqueous 2% by weight solutions of the hydroxypropyl methyl cellulose powders stored for one month and for two months are shown in Table 1.

Comparative Example 2

Without Addition of pH Regulator

Hydroxypropyl methyl cellulose powder was obtained in the same manner as in Comparative Example 1 except for use of wood pulp as the pulp. The hydroxypropyl methyl cellulose powder had a DS of 1.50 and an MS of 0.25, the viscosity at 20° C. of aqueous 2% by weight solution thereof of 30000 mPa·s, and a pH value of 6.2.

The hydroxylpropyl methyl cellulose powder thus obtained was heimetically sealed and stored in a constant temperature room of 80° C. The viscosities at 20° C. of aqueous 2% by weight solutions of the hydroxypropyl methyl cellulose powders stored for one month and for two months are shown in Table 1.

Comparative Example 3

Without Addition of pH Regulator

Hydroxypropyl methyl cellulose powder was obtained in the same manner as in Comparative Example 1 except for grinding with a rod mill. The hydroxypropyl methyl cellulose powder had a DS of 1.50 and an MS of 0.25, the viscosity at 20° C. of aqueous 2% by weight solution thereof of 100000 mPa·s, and a pH value of 6.8.

The hydroxypropyl methyl cellulose powder was hermetically sealed and stored in a constant temperature room of 80° C. The viscosities at 20° C. of aqueous 2% by weight solutions of the hydroxypropyl methyl cellulose powders stored for one month and for two months are shown in Table 1.

TABLE 1

|  | pH of aqueous 2 wt % solution at the beginning of storage | ignition residue (wt %) | viscosity of aqueous 2 wt % solution (mPa · s) | | |
| --- | --- | --- | --- | --- | --- |
|  |  |  | at the begging of storage | after 1 month storage | after 2 month storage |
| Example 1 | 10.3 | 0.2 | 100000 | 99000 | 99000 |
| Example 2 | 8.0 | 0.2 | 100000 | 96000 | 92000 |
| Example 3 | 7.1 | 0.2 | 100000 | 92000 | 86000 |
| Example 4 | 7.2 | 0.2 | 100000 | 93000 | 88000 |
| Example 5 | 9.0 | 0.2 | 100000 | 98000 | 95000 |
| Example 6 | 10.0 | 0.2 | 100000 | 99000 | 99000 |
| Example 7 | 7.1 | 0.2 | 30000 | 28000 | 27000 |
| Comp. Ex. 1 | 6.8 | 0.2 | 100000 | 82000 | 68000 |
| Comp. Ex. 2 | 6.2 | 0.2 | 30000 | 22000 | 17000 |
| Comp. Ex. 3 | 6.8 | 0.2 | 100000 | 82000 | 68000 |

The invention claimed is:

1. A method for producing a water-soluble nonionic cellulose ether, comprising:
    an etherification step of reacting an alkali cellulose with an etherifying agent to obtain a crude cellulose ether,
    a washing step of washing the crude cellulose ether with water to obtain a washed cellulose ether,
    a drying step of drying the washed cellulose ether, and
    a grinding step of grinding the cellulose ether during or after the drying step,
    wherein in the washing step or in any of the steps after the washing step, no acid is mixed but a pH regulator is mixed so as to allow an aqueous 2% by weight solution of the cellulose ether as an end product to have a pH value of from 7.0 to 10.5, and
    wherein the pH regulator is at least one selected from the group consisting of sodium hydroxide, potassium hydroxide, sodium bicarbonate, and sodium carbonate.

2. The method for producing a water-soluble nonionic cellulose ether according to claim 1, wherein the grinding step comprises grinding with a rod mill or a ball mill.

3. The method for producing a water-soluble nonionic cellulose ether according to claim 1, wherein the grinding step comprises a stage of grinding the cellulose ether and a stage of mixing the cellulose ether thus ground, the stage of mixing comprising an addition of the pH regulator.

4. The method for producing a water-soluble nonionic cellulose ether according to claim 1, further comprising, after the washing step but before the drying step, a gelation step of gelling the washed cellulose ether, the gelation step comprising an addition of the pH regulator.

5. The method for producing a water-soluble nonionic cellulose ether according to claim 1, wherein the washing step comprises a dispersing stage of dispersing the crude cellulose ether in the water to obtain a cellulose ether dispersion, and a filtration stage of filtering the dispersion, the dispersing stage comprising incorporation of the pH regulator into the cellulose ether dispersion.

6. The method for producing a water-soluble nonionic cellulose ether according to claim 5, wherein the dispersing stage comprises dispersing the crude cellulose ether in water, wherein the water is at a temperature of 70 to 100° C.

7. The method for producing a water-soluble nonionic cellulose ether according to claim 5, wherein the filtration stage comprises rinsing with a liquid at a temperature of 70 to 100° C.

8. The method for producing a water-soluble nonionic cellulose ether according to claim 1, wherein the washing step comprises a dispersing stage of dispersing the crude cellulose ether in the water to obtain a cellulose ether dispersion, and a filtration stage of filtering the dispersion to obtain a residue and rinsing the residue with a rinsing liquid containing the pH regulator.

9. The method for producing a water-soluble nonionic cellulose ether according to claim 1, wherein the drying step comprises adding a pH regulator before, during or after drying.

10. The method for producing a water-soluble nonionic cellulose ether according to claim 1, wherein the drying step and the grinding step are conducted simultaneously, the grinding step comprising grinding of the washed cellulose ether during drying and an addition of the pH regulator.

11. The method for producing a water-soluble nonionic cellulose ether according to claim 1, wherein the water-soluble nonionic cellulose ether comprises at least one of alkyl cellulose, hydroxyalkyl cellulose, and hydroxyalkyl alkyl cellulose.

12. The method for producing a water-soluble nonionic cellulose ether according to claim 1, wherein the etherifying agent comprises at least one of methyl chloride, ethylene oxide, and propylene oxide.

13. The method for producing a water-soluble nonionic cellulose ether according to claim 1, wherein the end product has a viscosity of from 30000 to 200000 mPa·s at 20° C. in an aqueous 2% by weight solution.

* * * * *